(12) United States Patent  
Lampinen et al.

(10) Patent No.: US 8,504,030 B2  
(45) Date of Patent: Aug. 6, 2013

(54) TRANSMISSION OF CHANNEL QUALITY INDICATIONS

(75) Inventors: Karl Marko Juhani Lampinen, Oulu (FI); Arto Lehti, Oulu (FI)

(73) Assignee: Renesas Mobile Corporation, Tokyo (JP)

( * ) Notice: Subject to any disclaimer, the term of this patent is extended or adjusted under 35 U.S.C. 154(b) by 75 days.

(21) Appl. No.: 13/291,653

(22) Filed: Nov. 8, 2011

(65) Prior Publication Data

US 2013/0115946 A1     May 9, 2013

(30) Foreign Application Priority Data

Nov. 7, 2011 (GB) .................................. 1119204.4

(51) Int. Cl.
*H04L 12/26* (2006.01)
*H04W 4/00* (2009.01)
*H04B 7/00* (2006.01)
*H04B 1/00* (2006.01)

(52) U.S. Cl.
USPC ........... 455/434; 370/252; 370/328; 455/522; 455/513; 375/144

(58) Field of Classification Search
USPC .................. 370/328, 329, 252; 375/267, 252, 375/144; 455/522, 69, 562.1, 63.4, 513
See application file for complete search history.

(56) References Cited

U.S. PATENT DOCUMENTS

| 7,693,551 | B2 * | 4/2010 | Ojard .......................... 455/562.1 |
| 7,720,034 | B2 * | 5/2010 | Seo et al. ....................... 370/336 |
| 2007/0121751 | A1 * | 5/2007 | Li et al. .......................... 375/267 |
| 2009/0196196 | A1 | 8/2009 | Ghosh et al. |
| 2011/0122962 | A1 * | 5/2011 | De Pasquale et al. ........ 375/267 |
| 2012/0113840 | A1 * | 5/2012 | Le Pezennec et al. ........ 370/252 |

FOREIGN PATENT DOCUMENTS

| EP | 2 387 281 A1 | 11/2011 |
| WO | WO 2010/073936 A1 | 7/2010 |

OTHER PUBLICATIONS

UK IPO Search Report under Section 17 dated Feb. 29, 2012 issued in a related British Application No. GB 1119204.4 (4 pages).

* cited by examiner

*Primary Examiner* — Nizar Sivji
(74) *Attorney, Agent, or Firm* — Lucas & Mercanti LLP; Robert P. Michal (57) ABSTRACT

Indications of desired radio communications downlink characteristics are transmitted via a radio communications uplink from a user equipment to a node of a cellular wireless network, the indications each relating to one or more components of a radio communications link from the node to the user equipment. The indications are transmitted successively at different cycles, and at each different cycle a first parameter is determined, indicating a more preferred number of components and a second parameter is determined, indicating a less preferred number of components. First additional parameters are calculated and transmitted relating to the desired radio communications link quality corresponding to the first parameter and second additional parameters are calculated and transmitted relating to the desired radio communications link quality on the basis of the second parameter. The first and second parameters are each parameters which are variable between different cycles.

18 Claims, 6 Drawing Sheets

FIG. 1

Step 2.1
Determining a first parameter, indicating a more preferred number of components which is a number of components which the user equipment would prefer to be included in said radio communications link by the user equipment; and determining a second parameter, indicating a less preferred number of components which is a number of components which may be included in said radio communications link should the more preferred number of components not be included Step 2.2
Calculating first additional parameters relating to the desired radio communications link quality corresponding to the first parameter; calculating second additional parameters relating to the desired radio communications link quality on the basis of the second parameter Step 2.3
Transmitting said first additional parameters in a first signalling field via said radio communications uplink; and transmitting said second additional parameters in a second signalling field via said radio communications uplink, wherein the first parameter, upon which the calculation of the first additional parameters included in the first signalling field is based, is a parameter which is variable between different cycles, and wherein the second parameter, upon which the calculation of the second additional parameters included in the second signalling field is based, which is included in the second signalling field, is a parameter which is variable between different cycles

| Information element / group name | Need | Multi | Type and reference | Semantics description | Version |
|---|---|---|---|---|---|
| MIMO operation | MP | | Enumerated (start, continue) | | REL-7 |
| CHOICE mode | MP | | | | REL-8 |
| FDD | | | | | REL-8 |
| >>MIMO N_cqi_typeA/M_cqi ratio | OP | | Enumerated (1/2,2/3, 3/4,5/6,7/8,8/9,9/10,1/1) | | REL-7 |
| >>MIMO number of layers for type B CQI report | | | Integer (1,2,3,4) | | |
| >>MIMO pilot configuration | OP | | MIMO pilot configuration 10.3.6.41b | | REL-7 |
| >>Precoding weight set restriction | OP | | Enumerated (true) | If present and MIMO operation is set to start, the UE starts using precoding weight set restriction | REL-7 |
| >TDD | | | | | REL-8 |
| >>CHOICE TDD option | MP | | | | REL-8 |
| >>1.28 Mcps TDD | | | | | REL-8 |
| >>>>MIMO SF mode for HS-PDSCH dual stream | MP | | Enumerated (SF1,SF1/SF16) | | REL-8 |
| >>>>HS-SICH reference signal info | OP | <1 to maxHSSCCHs> | | The order of the list corresponds to the order of HS-SCCHs in HS-SCCH info | REL-8 |
| >>>>Reference signal midamble configuration | MP | | Integer (2,4,6,8,10,12,14,16) | Midamble allocation mode is UE specific midamble allocation | REL-8 |
| >>>>Reference signal midamble shift | MP | | Integer (0..15) | The allocated midamble shift | REL-8 |
| >>>>Reference signal timeslot number | MP | | Integer (1..5) | | REL-8 |
| >>>3.84Mcps TDD or 7.68 Mcps TDD | | | | (no data) | REL-8 |

| Order type | Order mapping | | | Number of layers relative to type A CQI report |
|---|---|---|---|---|
| X | 0 | 0 | 0 | 0 |
| X | 0 | 0 | 1 | 1 |
| X | 0 | 1 | 0 | 2 |
| X | 0 | 1 | 1 | 3 |

FIG. 5

| Order type | Order mapping | | | Number of layers in type B CQI report |
|---|---|---|---|---|
| X | 0 | 0 | 0 | 1 |
| X | 0 | 0 | 1 | 2 |
| X | 0 | 1 | 0 | 3 |

FIG. 8 ns typically
TRANSMISSION OF CHANNEL QUALITY INDICATIONS

CROSS-REFERENCE TO RELATED APPLICATION

This application claims the benefit under 35 U.S.C. §119 of UK Patent Application No. 1119204.4 filed on Nov. 7, 2011, the entire disclosure of which is incorporated herein by reference.

TECHNICAL FIELD

The present invention relates generally to wireless systems, and more specifically, but not exclusively, to a method and apparatus relating to transmission of channel quality indications in a cellular wireless network using a multiple transmitter transmission format.

BACKGROUND

Cellular wireless networks typically comprise user equipments (UE) such as mobile handsets which may communicate via a network interface comprising a radio transceiver to a network of base stations connected to a telecommunications network. Such cellular wireless networks have undergone rapid development through a number of generations of radio access technology. The initial deployment of systems using analogue modulation has been superseded by second generation (2G) digital systems such as GSM (Global System for Mobile communications), implementing GERAN (GSM Enhanced Data rates for GSM Evolution Radio Access Network) radio access networks, and these systems have themselves been replaced by or augmented by third generation (3G) digital systems such as UMTS (Universal Mobile Telecommunications System), implementing the UTRAN (Universal Terrestrial Radio Access Network) radio access networks. Third generation standards provide for a greater throughput of data than is provided by second generation systems; this trend is continued with the introduction of High Speed Packet Access (HSPA), which may augment third generation systems, providing a high capacity packet switched downlink. HSPA typically uses adaptive modulation and coding to provide increased capacity when a channel has a good quality, for example a high signal to noise ratio. In a system such as HSPA using adaptive modulation and coding, a succession of Channel Quality Indicators (CQIs) is typically fed back from a receiver, typically at a user equipment, to a serving node for use in determining a transmission format, which may include a type of modulation and a type of coding, for use on a downlink from the node to the user equipment.

Multiple transmitter schemes, such as MIMO (multiple input, multiple output) and MIXO (multiple input, any output) have been proposed for use with HSPA and other wireless transmission formats. A multiple transmitter scheme may use multiple transmit antennas to provide a number of transmission streams, one or more or all of which may be received at a given user equipment, providing potentially greater capacity than a single transmitter scheme. A transmission stream may correspond to a transmitted beam, and may be referred to as a layer, and beams may overlap spatially. Multiple transmitter schemes may be used as part of a transmission format using adaptive modulation and coding, for example in a HSPA system. The CQI fed back from a user equipment to a serving node may indicate a transmission format preferred by the user equipment, including information relating to a number of multiple transmitter transmission streams on which data intended for the user equipment is to be transmitted. A second type of CQI may also be fed back, indicating a less preferred transmission format as a fallback position, which may be selected by the server for transmission if, for example, only a single transmission stream is to be transmitted.

In multiple transmitter schemes providing more than two transmission streams, there may be multiple potential fallback positions, corresponding to different numbers of transmitted transmission streams. The signalling overhead associated with sending a CQI appropriate to each possible number of transmission streams may be undesirable since it may increase the reporting delay of each individual report or increase overhead hence reducing system capacity for payload data.

It is an object of the invention to address at least some of the limitations of the prior art systems.

SUMMARY

In accordance with a first exemplary embodiment of the present invention, there is provided a method of transmitting, via a radio communications uplink, a plurality of indications of desired radio communications downlink characteristics from a user equipment to a node of a cellular wireless network, said indications each relating to one or more components of a radio communications link from the node to the user equipment, the method comprising transmitting said plurality of indications of desired radio communications downlink characteristics successively at different cycles by:

determining a first parameter, indicating a more preferred number of components which is a number of components which the user equipment would prefer to be included in said radio communications link by the user equipment;

determining a second parameter, indicating a less preferred number of components which is a number of components which may be included in said radio communications link should the more preferred number of components not be included;

calculating first additional parameters relating to the desired radio communications link quality corresponding to the first parameter;

calculating second additional parameters relating to the desired radio communications link quality on the basis of the second parameter;

transmitting said first additional parameters in a first signalling field via said radio communications uplink; and transmitting said second additional parameters in a second signalling field via said radio communications uplink, wherein the first parameter, upon which the calculation of the first additional parameters included in the first signalling field is based, is a parameter which is variable between different cycles, and wherein the second parameter, upon which the calculation of the second additional parameters included in the second signalling field is based, is a parameter which is variable between different cycles.

In accordance with a second exemplary embodiment of the present invention, there is provided a user equipment for transmitting, via a radio communications uplink, a plurality of indications of desired radio communications downlink characteristics to a node of a cellular wireless network, said indications each relating to one or more components of a radio communications link from the node to the user equipment, said plurality of indications of desired radio communications downlink characteristics being transmitted successively at different cycles, the user equipment comprising at least one processor and at least one memory including computer program code, the at least one memory and the computer program code configured to, with the at least one processor, cause the user equipment to:

determine a first parameter, indicating a more preferred number of components which is a number of components which the user equipment would prefer to be included in said radio communications link by the user equipment;

determine a second parameter, indicating a less preferred number of components which is a number of components which may be included in said radio communications link should the more preferred number of components not be included;

calculate first additional parameters relating to the desired radio communications link quality corresponding to the first parameter;

calculate second additional parameters relating to the desired radio communications link quality on the basis of the second parameter;

transmit said first additional parameters in a first signalling field via said radio communications uplink; and transmit said second additional parameters in a second signalling field via said radio communications uplink, wherein the first parameter, upon which the calculation of the first additional parameters included in the first signalling field is based, is a parameter which is variable between different cycles, and wherein the second parameter, upon which the calculation of the second additional parameters included in the second signalling field is based, is a parameter which is variable between different cycles.

In accordance with a third exemplary embodiment of the present invention, there is provided a node of a cellular wireless network for receiving, via a radio communications uplink, a plurality of indications of desired radio communications downlink characteristics from a user equipment, said indications each relating to one or more components of a radio communications link from the node to the user equipment, said plurality of indications of desired radio communications downlink characteristics being transmitted by the user equipment successively at different cycles, the node comprising at least one processor and at least one memory including computer program code, the at least one memory and the computer program code configured to, with the at least one processor, cause the node to at least:

transmit a first message to the user equipment carrying a transmitted indicator; and receive via said radio communications uplink, at each said different cycle, first additional parameters in a first signalling field and second additional parameters in a second signalling field, wherein said first additional parameters relate to a desired radio communications link quality calculated on the basis of a first parameter that indicates a more preferred number of components which is a number of components which the user equipment would prefer to be included in said radio communications link by the user equipment, and said second additional parameters relate to a desired radio communications link quality calculated on the basis of a second parameter that indicates a less preferred number of components which is a number of components which may be included in said radio communications link should the more preferred number of components not be included, wherein the first parameter, upon which the calculation of the first additional parameters included in the first signalling field is based, is a parameter which is variable between different cycles, and wherein the second parameter, upon which the calculation of the second additional parameters included in the second signalling field is based, is a parameter which is variable between different cycles, and which is derived from said transmitted indicator.

Further features and advantages of the invention will be apparent from the following description of preferred embodiments of the invention, which are given by way of example only.

DETAILED DESCRIPTION

By way of example an embodiment of the invention will now be described in the context of a 3GPP wireless communications system supporting communication using HSPA radio access technology. However, it will be understood that this is by way of example only and that other embodiments may involve wireless networks using other radio access technologies, such as LTE or IEEE802.16 WiMax systems.

Existing HSPA systems may be specified for use with a multiple transmitter communications link, such as a MIMO (multiple input, multiple output) or MIXO (multiple input, single or multiple output) scheme. For example, a MIMO scheme has been specified using two antennas at the base station to provide two transmissions streams, which may be referred to as layers or components, and which may be beamformed spatial beams. The beams may overlap in space, so that one or both of the beams may be received at a user equipment, and if both are received, this may be used to provide additional data capacity compared to the capacity of a single beam. In addition, adaptive modulation and coding may be used, and so, depending on channel quality, there are a variety of possible configurations of the downlink in terms of number of transmission streams and modulation and coding formats. The user equipment periodically send channel quality indicators (CQIs) to the serving node, typically a NodeB, to indicate a transmission format for use on the downlink, on the basis of measurements of downlink channel quality at the user equipment. In existing two transmission stream systems, there are two types of channel quality indicator (CQI) specified: Type A, and Type B, and these are typically sent alternately in a cyclic manner; a cycle may correspond to a period in which a CQI of each type is transmitted. The Type A CQI report can indicate transmission format requirements based on either one or two transmission streams, that is to say layers, depending on a decision taken at the user equipment as to the preferred number of transmission schemes. The Type B CQI report signals transmission requirements based on only one transmission stream, for use as a fallback position if the NodeB decides to transmit one transmission stream only. The transmission stream may be assumed by the NodeB to be the primary transmission stream on which the type A report is based.

If more than two transmission streams are to be specified, for example in a four antenna MIMO or MIXO system, then there may be more than one potential fallback position, according to the number of transmission streams that the NodeB decides to transmit. It may be unduly onerous in terms of signalling overhead to transmit CQI reports based on each possible number of transmission streams.

Figure 1:
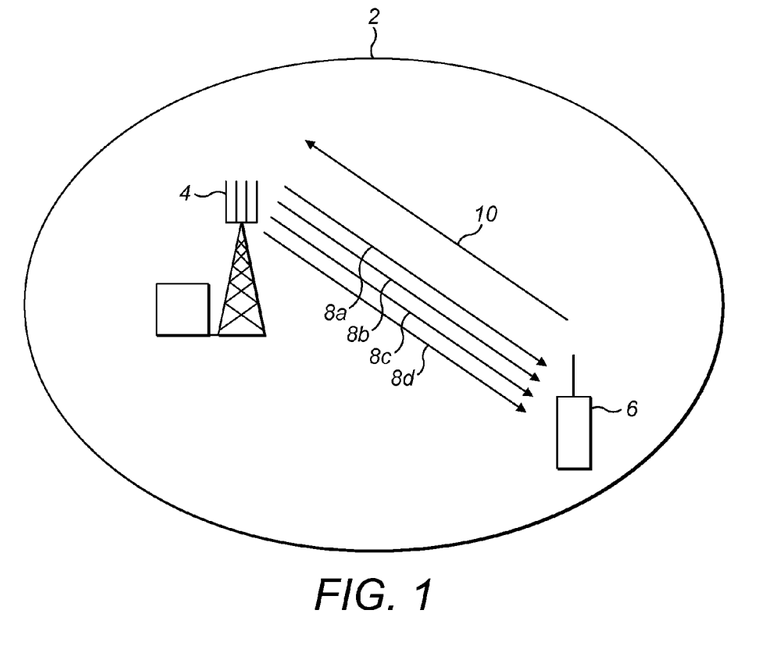
FIG. 1 is a schematic diagram showing a radio access network according to an embodiment of the invention.

FIG. 1 is a schematic diagram showing part of a cellular wireless network 2 according to an embodiment of the invention. A node of the network, base station serving node NodeB 4, sends four components 8a, 8b, 8c, 8d or a radio communications link from the node to a user equipment 6. The components may be transmission streams of a MIMO or MIXO transmission scheme, such as beamformed beams. The user equipment sends indications of desired downlink characteristics to the node, each relating to one or more of the components, via a radio communications uplink 10. The indications are transmitted successively at different cycles, and at each cycle, a first indication based on a preferred number of components, which may be a type A CQI report, and a second indication based on a less preferred number of components, which may be a Type B CQI report, is transmitted. Both the preferred number of components, which may be a number of transmission streams preferred by the user equipment based on measurements of channel quality, and the less preferred number of components, which may be a number of transmission streams to be used as a fallback if the NodeB decides not to transmit the number of transmission streams preferred by the user equipment, are variable between different cycles. This is by contrast with existing two transmission stream systems in which the Type B CQI report is always based on one transmission stream.

In an embodiment of the invention, at each cycle, a first parameter is determined, indicating a more preferred number of components, which is a number of components which the user equipment would prefer to be included in the radio communications link from the node to the user equipment, i.e. the downlink. This parameter may be a preferred number of transmission streams, and may be determined on the basis of channel quality measurements at the user equipment. Also at each cycle, a second parameter is determined, indicating a less preferred number of components, which is a number of components which may be included in the downlink should the more preferred number of components not be included. The decision as to which transmission stream of the candidate transmission streams is to be included in the selected number of transmission streams in the downlink transmission may be based on signalling which is separate from the CQI Type A and Type B reports.

The second parameter is determined by processing a third parameter, which may be referred to as an indicator. In an embodiment of the invention, the third parameter may, for example, be a delta parameter indicating a preferred difference between the preferred number of components and the less preferred number of components. In this case, the preferred difference is subtracted from the more preferred number of components to give a resultant number, and the second parameter is set to indicate a less preferred number of components which is the same as the resultant number, provided that resultant number is less than or equal to the preferred number of components. For example, if the preferred number is 4 and the preferred difference is also 2, the second parameter will be set to 2, according to this embodiment. However, if the preferred number is 2 and the preferred difference is also 2, the second parameter may be sent to 1.

In an alternative embodiment, the third parameter may be a parameter indicating a number of components preferred for use as a fallback position, and in this case, the third component may be processed by comparing the number of components indicated by the third parameter with the more preferred number of components, and setting the second parameter to indicate a less preferred number of components which is the same as the number of components indicated, dependent upon the number of components indicated by the third parameter being less than or equal to the more preferred number of components. For example, if the more preferred number of components is 3, and the number of components indicated by the third parameter is 2, then the less preferred number of components may be set to 2. However, if the more preferred number of components is 1, and the number of components indicated by the third parameter is 2, then the less preferred number of components may be set to 1. As an alternative, the number components indicated by the third parameter may simply be used as the less preferred number of components, irrespective of the more preferred number of components.

In an embodiment of the invention, the third parameter may be a predetermined parameter held at the user equipment, such as a default parameter. In an alternative embodiment, the third parameter may be received from the node, such as the NodeB, of the cellular wireless network in a message. The message may be received using Radio Resource Control (RRC) signalling, or by High Speed Shared Control Channel (HS-SCCH) signalling.

At each different cycle, first additional parameters are calculated relating to the desired radio communications link quality corresponding to the first parameter. For example, the first additional parameters may be the contents of a Type A CQI report, relating to transmission parameters for a more preferred number of transmission streams. The first additional parameters are then transmitted in a first signalling field, that may be the Type A CQI report. Second additional parameters are calculated, relating to the desired radio communications link quality on the basis of the second parameter. For example, the second additional parameters may be the contents of a Type B CQI report, relating to transmission parameters for a less preferred number of transmission streams. The second additional parameters do not necessarily explicitly include the number of transmission streams; this may have been signalled to the user equipment from the node, and so there may be no need for the user equipment to signal this back to the node. Not explicitly including the number of transmission streams in the Type B signalling has the advantage that signalling overhead is reduced, and signalling fields in the Type B report that may otherwise be used to signal a number of transmission streams may be free for use for other purposes. Furthermore, a legacy Type B signalling format, that does not have provision for signalling a number of transmission streams, may be used. The second additional parameters are then transmitted in a second signalling field, that may be the Type B CQI report.

Both the first parameter, upon which the calculation of the first additional parameters included in the first messaging field is based, and the second parameter, upon which the calculation of the second additional parameters used in the second signalling field is based, are variable between different cycles. An advantage of varying the second parameter between different cycles is that the second additional parameters may be calculated to be appropriate to a fallback position using a number of components that varies between different cycles, so that as channel quality conditions change, an appropriate fallback position may be selected.

Figure 2:
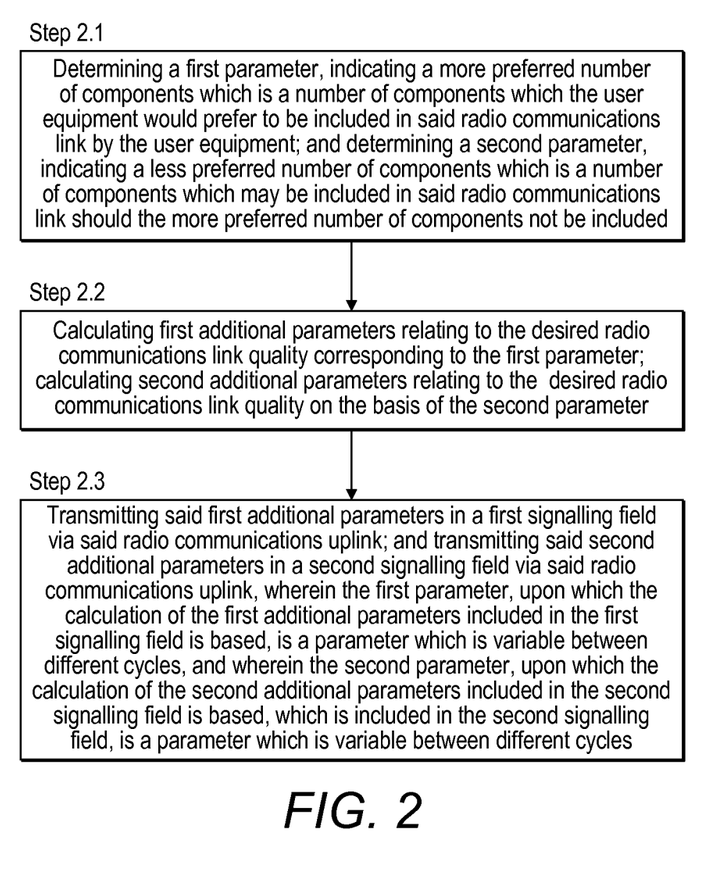
FIG. 2 is a flow diagram of a method according to an embodiment of the invention.

FIG. 2 is as flow diagram, illustrating an embodiment of the invention as steps 2.1, 2.2, and 2.3, as already described.

Figure 3:
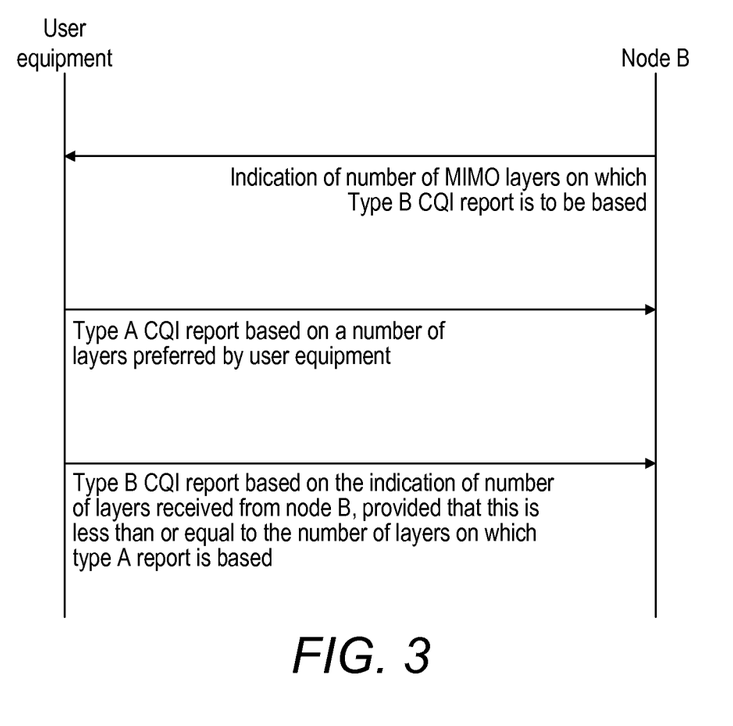
FIG. 3 is a diagram illustrating signal flow in an embodiment of the invention.

FIG. 3 is a diagram showing signalling flow in an embodiment of the invention. As illustrated, a NodeB sends an indication of a number of MIMO layers on which a Type B CQI report is to be based to the user equipment. This indication may be sent, for example, using Radio Resource Control (RRC) or High Speed Shared Control Channel (HS-SCCH) signalling. The user equipment send a Type A CQI report based on a number of layers preferred by the user equipment, and a Type B CQI report based on the indication of the number of layers received from Node B, provided this is less than or equal to the number of layers on which the type A report is based.

Figure 4:
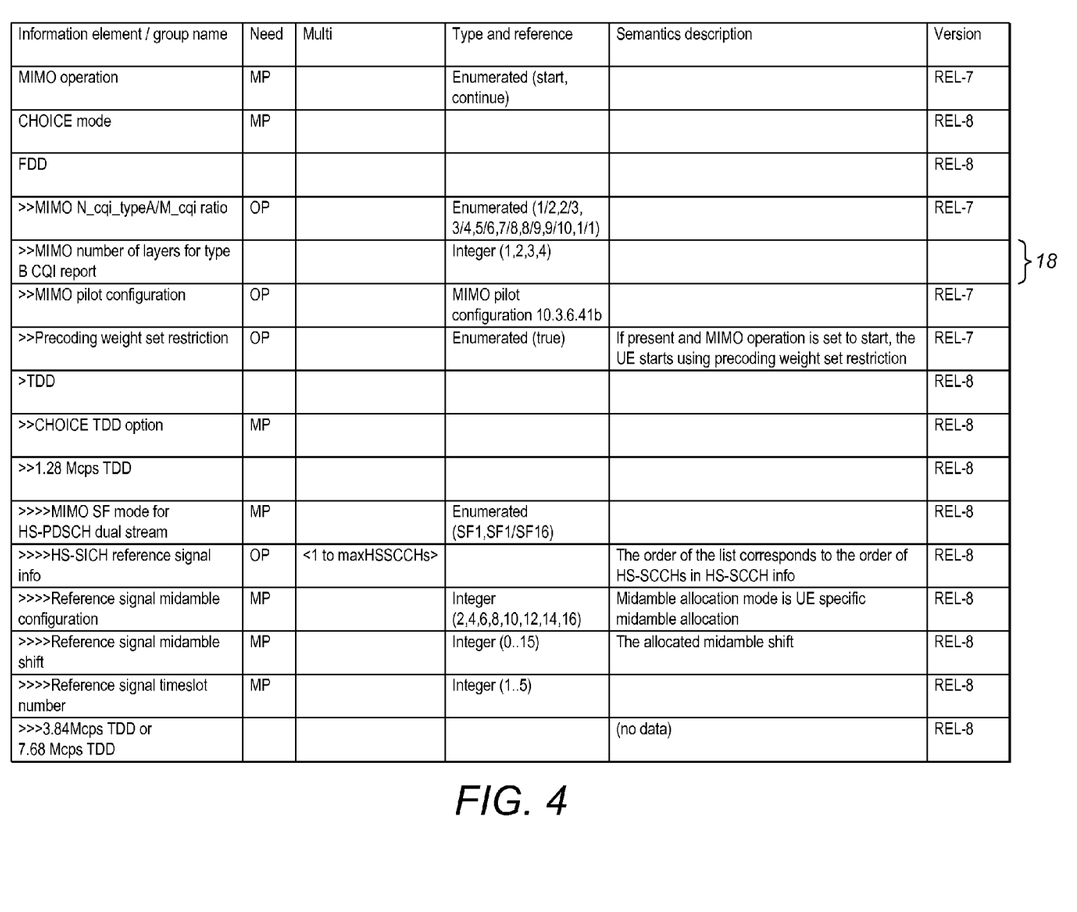
FIG. 4 is a diagram illustrating information element fields in an embodiment of the invention.

FIG. 4 illustrates an example of signalling fields in an embodiment of the invention. An information element 18 is included indicating a number of MIMO layers for the Type B CQI report. This may be, for example, the third parameter already mentioned.

Figure 5:
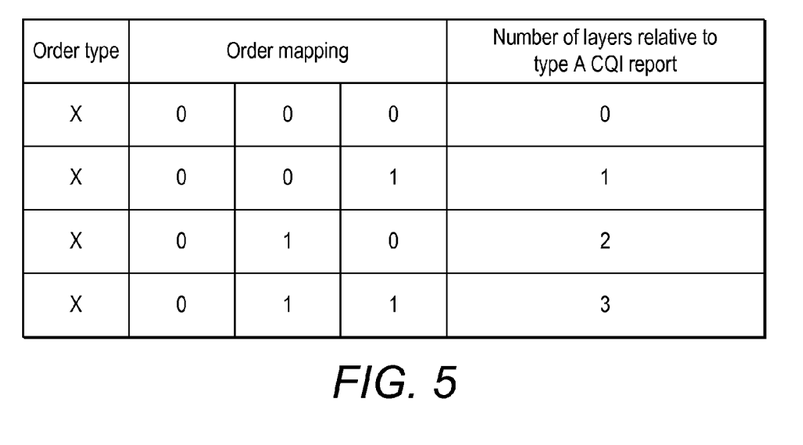
FIG. 5 is a diagram illustrating a signalling element indicating a number of layers on which a Type B CQI report should be based relative to the number of layers on which a Type A CQI report is based.

FIG. 5 shows a signal format by which a number of layers on which a Type B report may be based may be signalled by a delta parameter indicating a number of layers relative to the number of layers in Type A CQI report.

Figure 6:
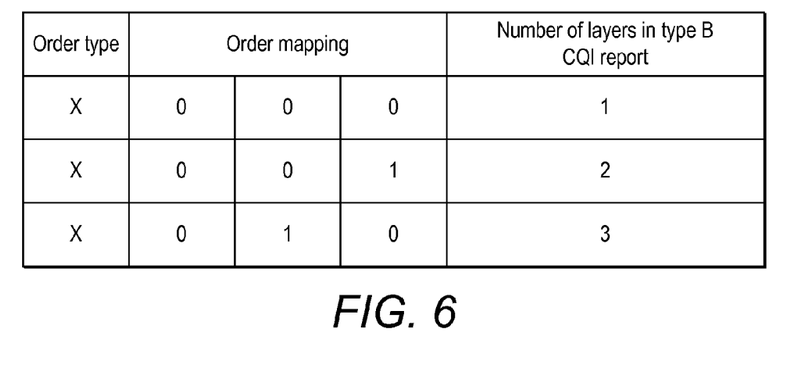
FIG. 6 is a diagram illustrating a signalling element indicating a number of layers on which a Type B CQI report should be based.

FIG. 6 shows a signal format by which the number of layers on which a Type B report may be based may be signalled.

Figure 7:
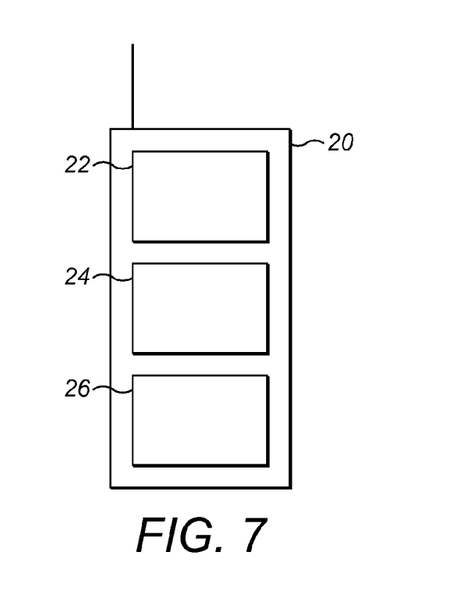
FIG. 7 is a schematic diagram of a user equipment in an embodiment of the invention.

FIG. 7 illustrates a user equipment 20 according to an embodiment of the invention. A transceiver 22 is controlled by a processor 24 including a controller, which has access to a memory 26 on which instructions to carry out the steps of embodiments of the invention may be stored. A user equipment may be, for example, a mobile or cell phone (including a so-called "smart phone"), a personal digital assistant, pager, tablet or laptop computer, a content-consumption or generation device (for music and/or video for example), a data card, or USB dongles, etc.

Figure 8:
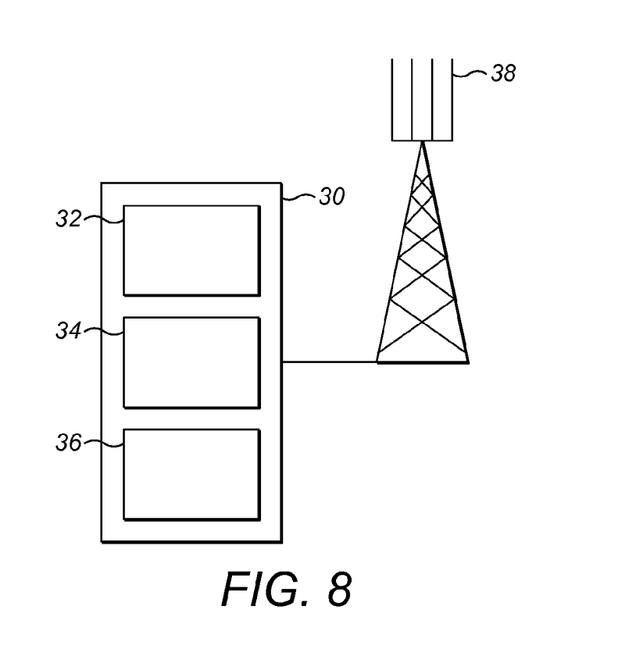
FIG. 8 is a schematic diagram of a node of a cellular wire network in an embodiment of the invention.

FIG. 8 illustrates a node of the wireless network according to an embodiment of the invention. A module 30 comprises a transceiver 32 is controlled by a processor 34 including a controller, which has access to a memory 36 on which instructions to carry out the steps of embodiments of the invention may be stored. The module 30 is connected to an antenna unit 38, having a plurality of antennas. The node may, for example, be a nodeB of a HSPA cellular wireless network.

Embodiments of the invention will now be described in more detail.

Currently a 2×2 MIMO transmission scheme may be used with HSPA systems, having two components or layers, that may be beamformed beams. It is proposed to increase the number of beamformed beams to 4, but this may lead in some circumstances to 4 different CQI reports: a Type A report based on user equipment preferred rank (number of MIMO layers) and multiple type B reports for different number of layers. This may be undesirable, as it may increase the reporting cycle, that is to say delay of the report or signalling overhead, of each individual feedback report too much. The CQI information can take into account 4 different layer counts (1, 2, 3 or 4), even though the number of Hybrid Automatic Repeat Request (HARQ) processes may be limited to for example to 2. In this case, one HARQ process could span multiple layers.

In an embodiment of the invention, the CQI report types are defined as Type A and Type B. In a Type A report, the CQI report is based on the number of layers preferred by the UE. Any rank value, ie. number of layers, can be signalled. This report may be the same as it is in current specification. In a Type B report, the CQI report is based on a number of layers which can be either based on a default value, or a number of layers configured by higher layers (semi static signalling), such a Radio Resource Control (RRC) signalling. Due to the slow pace of signalling, a previously signalled number of layers may be assumed until new signalling is received. Alternatively, a number of layers may be signalled by a fast physical layer HS-SCCH order. Again, a previously signalled number of layers can be assumed until a new order arrives. The signalling number of layers may be applied to the next signalling CQI after a specified delay.

In an embodiment of the invention, a number of layers for use in the Type B CQI report may be signalled using RRC signalling as follows. The user equipment may receive for example an ACTIVE SET UPDATE or CELL UPDATE CONFIRM message, which may contain the MIMO parameters IE. This IE currently contains the CQI related configurations such as the MIMO N_cqi_typeA/M_cqi ratio. This is one possible place to define the information on the default number of layers for the type B report or alternatively this IE can be used to update the information. One possible implementation is shown in FIG. 4 where modifications to the existing format are indicated by reference numeral 18.

In alternative embodiments HS-SCCH orders may be used for signalling the number of layers that is used to derive the type B CQI. This may be done for example by at least two methods. A first method concerns delta signalling based on the type A report. Assuming a number of layers in the previous type A report, $N_{1A}$, the number of layers in type B report equals $N_{1B}=N_{1A}-Delta_1$. Including 0 delta has the potential benefit that some user equipments may reduce feedback delay in conditions where both type A and B would use the same assumption on the number of layers. The order type can be chosen to be some unused 3 bit value e.g. '011' in binary format; any free order can be used for the purpose. A second method concerns absolute signalling of the number of layers on which the type B report is to be based. In this case, the number of layers in type B report equals $N_{1B}$ and 3 HS-SCCH orders are required as shown in FIG. 6.

In both methods an initial default value may be to be considered before receiving any orders. For example, the number of layers on which a Type B CQI report is to be based may be assumed to equal 1 as a default in the absence of signalling. This may be particularly advantageous for a user equipment that is close to the edge of a cell, for example. In the HS-SCCH process, the UE sends an acknowledgement (ACK) after successful decoding of the order, that is to say the HS-SCCH message. It may be assumed that if the ACK response is sent, the order is applicable after the ACK transmission.

In an embodiment of the invention, higher layers, for example using RRC signalling, may configure some default number of layers for Type B CQI. The HS-SCCH order could be used to change number of layers only for the next CQI transmission. For the following CQI reports, the default value may be used once again.

HS-SCCH orders may be used to request the user equipment to transmit the CQI report with a number of layers specified in the order. The user equipment may then transmit a CQI after a specified delay has passed independent of the type A and B transmission pattern.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of transmitting, via a radio communications uplink, a plurality of indications of desired radio communications downlink characteristics from a user equipment to a node of a cellular wireless network, said indications each relating to one or more components of a radio communications link from the node to the user equipment, the method comprising transmitting said plurality of indications of desired radio communications downlink characteristics successively at different cycles by:
   determining a first parameter, indicating a more preferred number of components which is a number of components which the user equipment would prefer to be included in said radio communications link by the user equipment;
   determining a second parameter, indicating a less preferred number of components which is a number of components which may be included in said radio communications link should the more preferred number of components not be included;
   calculating first additional parameters relating to the desired radio communications link quality corresponding to the first parameter;
   calculating second additional parameters relating to the desired radio communications link quality on the basis of the second parameter;
   transmitting said first additional parameters in a first signalling field via said radio communications uplink; and
   transmitting said second additional parameters in a second signalling field via said radio communications uplink,
   wherein the first parameter, upon which the calculation of the first additional parameters included in the first signalling field is based, is a parameter which is variable between different cycles,
   wherein the second parameter, upon which the calculation of the second additional parameters included in the second signalling field is based, is a parameter which is variable between different cycles, and
   wherein said determining of the second parameter is performed by processing a third parameter.

2. A method according to claim 1, wherein the third parameter indicates a preferred difference between the more preferred number of components and the less preferred number of components, and said processing of the third parameter comprises:
   subtracting the preferred difference indicated by the third parameter from the more preferred number of components to give a resultant number; and
   setting the second parameter to indicate a less preferred number of components in dependence on the resultant number.

3. A method according to claim 1, wherein said a third parameter indicates a number of components preferred for use as a fallback position, and said processing of the third parameter comprises:
   comparing the number of components indicated by the third parameter with the more preferred number of components; and
   setting the second parameter to indicate a less preferred number of components which is the same as the number of components indicated by the third parameter, dependent upon the number of components indicated by the third parameter being less than or equal to the more preferred number of components.

4. A method according to claim 1, wherein the third parameter is a predetermined parameter held at the user equipment.

5. A method according to claim 1, the method comprising receiving the third parameter from the node of the cellular wireless network in a first message.

6. A method according to claim 5, wherein the first message is received using Radio Resource Control signalling.

7. A method according to claim 5, wherein the first message is received using High Speed Shared Control Channel signalling.

8. A method according to claim 1, wherein:
   said radio communications link from the node to the user equipment is a High Speed Downlink Packet Access link;
   the first field is a Type A Channel Quality Indicator message; and
   the second field is a Type B Channel Quality Indicator message.

9. A method according to claim 1, wherein said one or more components are transmission streams of a multiple transmitter communication link.

10. A user equipment for transmitting, via a radio communications uplink, a plurality of indications of desired radio communications downlink characteristics to a node of a cellular wireless network, said indications each relating to one or more components of a radio communications link from the node to the user equipment, said plurality of indications of desired radio communications downlink characteristics being transmitted successively at different cycles, the user equipment comprising at least one processor and at least one memory including computer program code, the at least one memory and the computer program code configured to, with the at least one processor, cause the user equipment to:

determine a first parameter, indicating a more preferred number of components which is a number of components which the user equipment would prefer to be included in said radio communications link by the user equipment;

determine a second parameter, indicating a less preferred number of components which is a number of components which may be included in said radio communications link should the more preferred number of components not be included;

calculate first additional parameters relating to the desired radio communications link quality corresponding to the first parameter;

calculate second additional parameters relating to the desired radio communications link quality on the basis of the second parameter;

transmit said first additional parameters in a first signalling field via said radio communications uplink; and transmit said second additional parameters in a second signalling field via said radio communications uplink, wherein the first parameter, upon which the calculation of the first additional parameters included in the first signalling field is based, is a parameter which is variable between different cycles, wherein the second parameter, upon which the calculation of the second additional parameters included in the second signalling field is based, is a parameter which is variable between different cycles, and wherein said determining of the second parameter is performed by processing a third parameter.

11. A user equipment according to claim 10, wherein the third parameter indicates a preferred difference between the more preferred number of components and the less preferred number of components, and said processing of the third parameter comprises:

subtracting the preferred difference indicated by the third parameter from the more preferred number of components to give a resultant number; and setting the second parameter to indicate a less preferred number of components in dependence on the resultant number.

12. A user equipment according to claim 10, wherein the third parameter indicates a number of components preferred for use as a fallback position, and said processing of the third parameter comprises:

comparing the number of components indicated by the third parameter with the more preferred number of components; and setting the second parameter to indicate a less preferred number of components which is the same as the number of components indicated by the third parameter, dependent upon the number of components indicated by the third parameter being less than or equal to the more preferred number of components.

13. A user equipment according to claim 10, wherein the third parameter is a predetermined parameter held at the user equipment.

14. A user equipment according to claim 10, the user equipment being configured to receive the third parameter from the node of the cellular wireless network in a first message.

15. A user equipment according to claim 14, wherein the user equipment is configured to receive the first message using Radio Resource Control signalling.

16. A user equipment according to claim 14, wherein the user equipment is configured to receive the first message using High Speed Shared Control Channel signalling.

17. A user equipment according to claim 10, wherein:

said radio communications link from the node to the user equipment is a High Speed Downlink Packet Access link;

the first field is a Type A Channel Quality Indicator message;

the second field is a Type B Channel Quality Indicator message; and said one or more components are transmission streams of a multiple transmitter communication link.

18. A node of a cellular wireless network for receiving, via a radio communications uplink, a plurality of indications of desired radio communications downlink characteristics from a user equipment, said indications each relating to one or more components of a radio communications link from the node to the user equipment, said plurality of indications of desired radio communications downlink characteristics being transmitted by the user equipment successively at different cycles, the node comprising at least one processor and at least one memory including computer program code, the at least one memory and the computer program code configured to, with the at least one processor, cause the node to at least:

transmit a first message to the user equipment carrying a transmitted indicator; and receive via said radio communications uplink, at each said different cycle, first additional parameters in a first signalling field and second additional parameters in a second signalling field, wherein said first additional parameters relate to a desired radio communications link quality calculated on the basis of a first parameter that indicates a more preferred number of components which is a number of components which the user equipment would prefer to be included in said radio communications link by the user equipment, and said second additional parameters relate to a desired radio communications link quality calculated on the basis of a second parameter that indicates a less preferred number of components which is a number of components which may be included in said radio communications link should the more preferred number of components not be included, wherein the first parameter, upon which the calculation of the first additional parameters included in the first signalling field is based, is a parameter which is variable between different cycles, wherein the second parameter, upon which the calculation of the second additional parameters included in the second signalling field is based, is a parameter which is variable between different cycles, and which is derived from said transmitted indicator, and wherein said second parameter is determined by processing a third parameter.

* * * * *